United States Patent [19]

Turner

[11] Patent Number: 5,475,714
[45] Date of Patent: Dec. 12, 1995

[54] DC REMOVAL CIRCUIT FOR DIGITAL SIGNAL

[75] Inventor: Rudolf Turner, Hawthorn Woods, Ill.

[73] Assignee: Zenith Electronics Corporation, Glenview, Ill.

[21] Appl. No.: 259,284

[22] Filed: Jun. 13, 1994

[51] Int. Cl.⁶ .............................. H04L 25/34; H04L 25/49
[52] U.S. Cl. .............................................. 375/286; 375/293
[58] Field of Search ..................................... 375/286, 292, 375/293, 316, 317, 319, 345; 327/307; 348/257, 677, 689; 341/126, 139, 155

[56] References Cited

U.S. PATENT DOCUMENTS 4,071,829 1/1978 Davis et al. .............................. 375/345
4,972,189 11/1990 Polito et al. ............................. 341/126

*Primary Examiner*—Stephen Chin
*Assistant Examiner*—Don N. Vo

[57] ABSTRACT

A DC removal circuit for removing residual DC from a digitally encoded signal including a plurality of multi level data symbols occurring at a constant symbol rate and formatted in repetitive data fields, each including repetitive data segments having data segment sync. A derived value is subtracted from each of the received data symbols. The output of the subtractor is sampled, at a rate that is less than the symbol rate, and the sampled output is accumulated in an accumulator for generating the derived value. The sampling is synchronized with the data segment sync to avoid sampling the data segment sync and the accumulator is disabled until data segment lock is achieved.

11 Claims, 1 Drawing Sheet

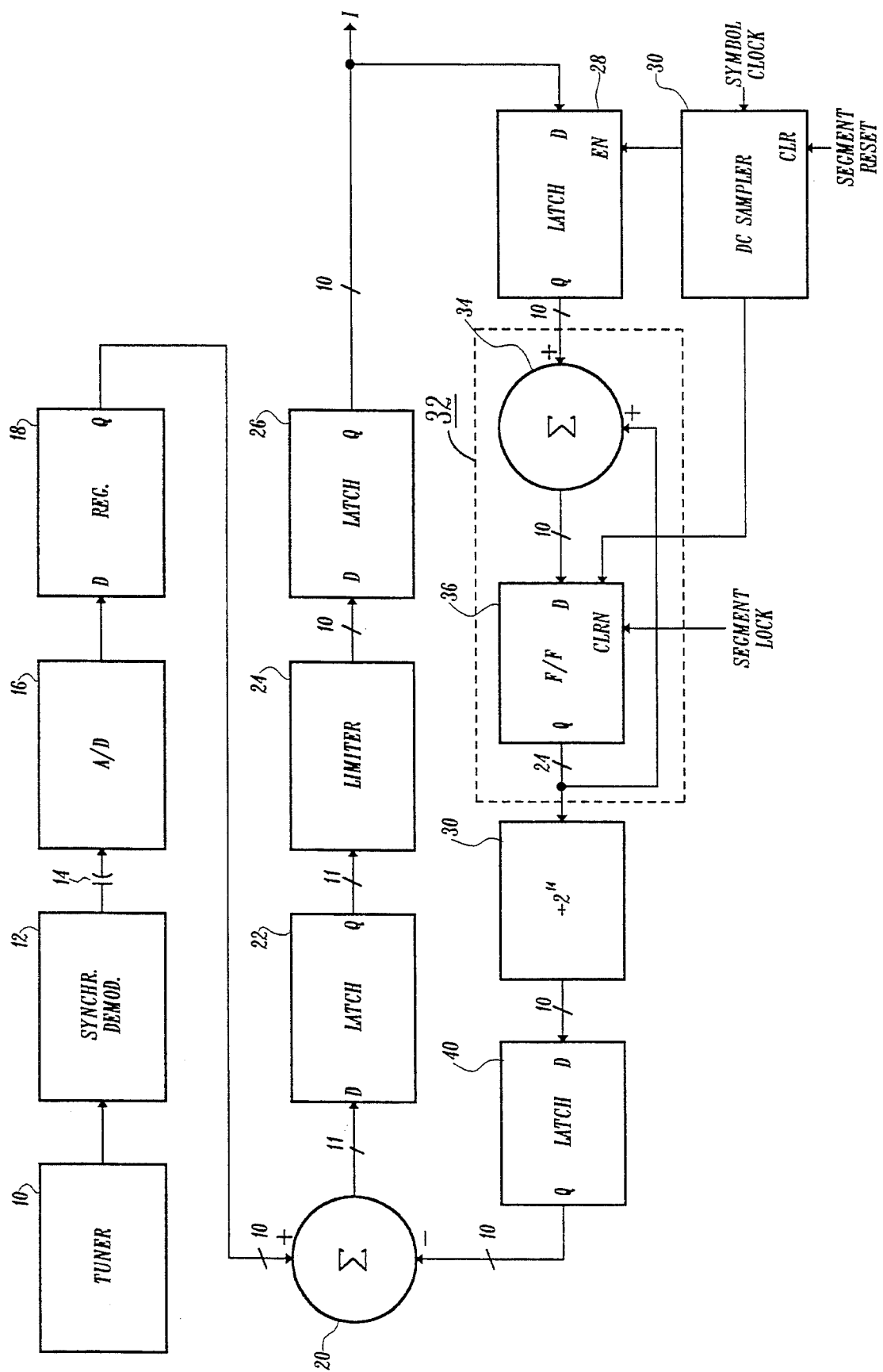

DC REMOVAL CIRCUIT FOR DIGITAL SIGNAL

BACKGROUND OF THE INVENTION AND PRIOR ART

This invention concerns the removal of DC from a digitally encoded signal comprising a plurality of multi level data symbols. The data symbols are formatted in repetitive data fields having a repetition rate $F_S$, each organized into a plurality of repetitive data segments, each of which includes a data segment sync signal. The digitally encoded signal is transmitted in analog form and, in the preferred embodiment, includes a DC offset that represents a pilot. The pilot is recovered in the receiver and used to synchronize and lock up the received signal. The DC offset is removed before the signal is applied to an analog to digital (A/D) converter, which optimizes the use of the A/D converter. The converted signal is supplied to digital processing circuitry where the signal is sliced to recover the symbol levels. The recovered symbols are arranged in digital bytes, deinterleaved to undo the error protection and interleaving performed at the transmitter, applied to a Reed Solomon decoder for error correction to achieve the correct symbols. These symbols are used to develop the video, audio and auxiliary data.

The method and apparatus of the invention removes any residual DC that finds its way into the signal due to the digital processing components and the integrated circuit format. In the digital domain, even small residual DC components can be very detrimental.

OBJECTS OF THE INVENTION

A principal object of the invention is to provide a novel processing circuit for a digital signal having multi level data symbols.

Another object of the invention is to provide a method of removing residual DC from a digital signal having multi level data symbols.

A further object of the invention is to provide a simple automatic DC removal circuit for a digital signal having multi level data symbols.

BRIEF DESCRIPTION OF THE DRAWING

These and other objects and advantages of the invention will be apparent upon reading the following description in conjunction with the drawing, the single figure of which is a partial block diagram of a television receiver incorporating the invention.

DESCRIPTION OF THE PREFERRED EMBODIMENT

A tuner 10 receives a transmitted digitally encoded signal comprising a plurality of multi level data symbols organized in a repetitive field format with each field including a plurality of repetitive data segments, each having a data segment sync character. The signal may be received terrestrially, i.e. over the air, or via a cable from a cable head end. The tuner 10 selects the desired one of the incoming signals and supplies it to a synchronous demodulator 12, where it is demodulated. The demodulated signal is supplied through a capacitor 14, which removes the DC offset (pilot) from the signal and the signal is applied to an A/D converter 16. As discussed above, the DC offset is used by the synchronous demodulator 12 to lock up the received signal. Capacitor 14 removes the DC offset to optimize the operating range of A/D converter 16. The signal is converted into digital form with the number of bits in the digital signal being indicated by the numbers adjacent the slashed lines in the drawing. The 10 bit digital signal from A/D converter 16 is applied to a 10 bit wide register 18, the output of which is supplied to a subtractor 20 where a derived value is subtracted, as will be described. (In a cable environment, an 8 bit digital signal is preferably used.) The output of subtractor 20 is an 11 bit number which is applied to a register or latch 22, the output of which is applied to a limiter 24 where the 11 bit number is processed back to a 10 bit number. The output of limiter 24 is applied to another latch 26 from which the output I signal (with residual DC removed) is taken.

Latch 26 is operated at the symbol rate. The output of latch 26 is applied to another latch 28 which is operated at a much lower rate by virtue of its being driven from a DC sampler circuit 30. In practice, the operating frequency for latch 28 is equal to 684 H/52 or 206,966 Hz where H is the NTSC horizontal scanning rate, based upon 832 symbols/segment to effect periodic sampling of the output of latch 26, although non-uniform sampling techniques can also be used. DC sampler 30 is driven by the symbol clock and, in the preferred embodiment, divides the symbol clock signal by N where N is equal to 52. It will be appreciated that N need not be 52, but may be any integer greater than 1, as will be explained. The 10 bit number output of latch 28 is applied to an accumulator 32. Accumulator 32 includes an adder 34 and a flip/flop 36. Adder 34 receives the 10 bit number from latch 28 and supplies it the D input of flip/flop 36. The Q output of flip/flop 36 is connected back to the input of adder 34, where it is added. The flip/flop 36 is clocked by a clocking signal at a 684 H/52 rate from DC sampler 30 and is held to zero until segment lock is obtained. The segment lock signal is applied to CLRN of flip/flop 36. The function of accumulator 32 is to accumulate the DC values of the sampled symbols on a continual basis once segment lock is achieved. The output of accumulator 32 is a 24 bit number that is applied to a divider 30 where it is divided by a factor of $2^{14}$. The output of divider 30 is applied to a latch 40 that is enabled at a field rate to update the derived value of DC that is subtracted in subtractor 20 from the input signal at the beginning of each field.

In operation, as the input signal emerges from register 26, it is sampled (at a much lower rate than the symbol rate) and the magnitudes of the sampled signals are accumulated by accumulator 32. The output of the accumulator is divided and, at the field rate, used to update the derived value of DC that is to be subtracted from the incoming signal. Therefore, once every field a derived value of DC, which is based upon the accumulation of symbol samples of the previous field is subtracted from the incoming signal. Under normal conditions, the symbol values will average out to zero, that is there will be as many symbols on the positive side of a zero axis as on the negative side. Should the average rise because of some residual DC, the sampling and accumulating arrangement will develop a larger output and increase the derived value of DC that is subtracted from the incoming signal, thus tending to stabilize the incoming signal at a zero residual DC point. The speed of operation of the circuit is determined by the feedback gain. It will be appreciated that the sampling arrangement in the preferred embodiment operates at significantly lower frequency than the symbol clock frequency. The purpose is sample random data and not a fixed repetitive pattern, such as segment sync. In the preferred embodiment, the data segment sync is a series of two level symbols, and the divide ratio is selected so that sampling does not occur when the data segment sync occurs. Also, the provisions of the segment lock signal for enabling flip/flop 36 and accumulator 32 prevents the accumulator from operating until data segment lock has been achieved in the circuit.

What has been described is a novel DC removal circuit for removing residual DC in a digital signal comprising a plurality of multi level symbols occurring at a fixed rate. It is recognized that numerous changes in the described embodiment of the invention will be apparent to those skilled in the art without departing from its true spirit and scope. The invention is to be limited only as defined in the claims.

What is claimed is:

1. A method of removing DC from a digitally encoded input signal comprising a plurality of multi level data symbols having a repetition rate $F_s$ comprising:

subtracting a derived value from each of the data symbols for removing the DC component of said encoded input signal and producing a subtracted signal output;

sampling said subtracted signal output at a rate less than $F_s$ to produce plurality of samples; and accumulating the samples for generating said derived value.

2. The method of claim 1 wherein said encoded input signal is formatted in data fields and further comprising updating said derived value at the beginning of each of said data fields.

3. The method of claim 2 wherein said encoded input signal is formatted in the form of data segments and includes data segment sync, further comprising synchronizing said sampling of said subtracted signal output with said data segment sync to avoid sampling said data segment sync.

4. The method of claim 3 wherein said accumulating is delayed until data segment lock is achieved.

5. The method of claim 4 wherein said sampling occurs at a rate substantially equal to $F_s/N$ where N is an integer greater than 1.

6. The method of claim 5 wherein N is equal to 52.

7. A DC removal circuit comprising:

means for receiving a digitally encoded input signal comprising a plurality of multi level data symbols having a repetition rate $F_s$ and having levels above and below a zero value;

subtracting means for subtracting a derived value from each of said multi level data symbols for substantially removing the DC component of said encoded input signal;

means for sampling the output of said subtracting means at a rate less than $F_s$ to produce plurality of samples; and means for accumulating the samples for generating said derived value.

8. The circuit of claim 7 wherein said encoded signal is formatted in repetitive data fields, each including a plurality of repetitive data segments and including data segment sync and further including means for updating said derived value at the beginning of each of said repetitive data fields.

9. The circuit of claim 8, further including means for synchronizing said sampling means with said data segment sync to avoid sampling of said data segment sync.

10. The circuit of claim 9 wherein said sampling means samples said output of said subtracting means at a rate of $F_s/N$ where N is an integer greater than 1.

11. The circuit of claim 10 wherein N is equal to 52.

* * * * *